US010116165B2

(12) United States Patent
Bernal et al.

(10) Patent No.: US 10,116,165 B2
(45) Date of Patent: Oct. 30, 2018

(54) POWERGRID OPERATION AND SUPERVISION SYSTEM

(71) Applicant: GENERAL ELECTRIC TECHNOLOGY GMBH, Baden (CH)

(72) Inventors: Reynaldo Bernal, San Jose, CA (US); John Wulf, Carmel, CA (US); Ali Sadjadpour, Mill Creek, WA (US); Tory McKeag, Duvall, WA (US)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 380 days.

(21) Appl. No.: 14/660,309

(22) Filed: Mar. 17, 2015

(65) Prior Publication Data

US 2015/0263522 A1 Sep. 17, 2015

Related U.S. Application Data

(60) Provisional application No. 61/954,563, filed on Mar. 17, 2014.

(51) Int. Cl.
*H02J 13/00* (2006.01)

(52) U.S. Cl.
CPC ......... *H02J 13/001* (2013.01); *H02J 13/0062* (2013.01); *H02J 13/0075* (2013.01); *Y02E 60/74* (2013.01); *Y02E 60/7838* (2013.01); *Y02E 60/7853* (2013.01); *Y04S 10/30* (2013.01); *Y04S 10/40* (2013.01); *Y04S 40/124* (2013.01); *Y04S 40/126* (2013.01)

(58) Field of Classification Search
USPC .................. 700/286–287, 291–297
See application file for complete search history.

(56) References Cited

U.S. PATENT DOCUMENTS

| 7,797,179 | B2 * | 9/2010 | Chakraborty | G06Q 10/06 702/182 |
| 2005/0278075 | A1 * | 12/2005 | Rasmussen | H02J 9/06 700/286 |
| 2006/0064205 | A1 * | 3/2006 | Ying | H01H 9/32 700/286 |
| 2009/0287739 | A1 * | 11/2009 | Zhang | G06Q 10/06 |
| 2011/0196630 | A1 * | 8/2011 | Dong | H02J 3/006 702/62 |

(Continued)

OTHER PUBLICATIONS

Li et al., "A Reliability Based Approach to Transmission Maintenance Planning and Its application in BC Hydro system", 2001, IEEE, pp. 510-515.*

*Primary Examiner* — Jason Lin
(74) *Attorney, Agent, or Firm* — Amin, Turocy & Watson, LLP

(57) ABSTRACT

Various aspects of the disclosure provide for an integrated system to facilitate operational and supervisory functions for transmission and distribution power grids. The system can facilitate switching operations for the power grid as well as providing an integrated planning, scheduling, and logging of power grid supervisory functions in order to reduce human error, improve labor efficiencies, and provide tools to assist in daily work plan assignments. The system includes modules to assist with outage and switching management, as well as modules for daily operation planning, work assignment planning, interruption tracking and analysis, and logging and recordkeeping.

26 Claims, 12 Drawing Sheets

(56) References Cited

U.S. PATENT DOCUMENTS

| | | | | |
|---|---|---|---|---|
| 2012/0253539 A1* | 10/2012 | McMullin | ............... | H02J 3/006 700/297 |
| 2012/0283988 A1* | 11/2012 | Pandey | ................. | G06Q 30/06 702/179 |
| 2012/0323395 A1* | 12/2012 | Sato | ........................ | H02J 3/008 700/297 |
| 2014/0036306 A1* | 2/2014 | Matsuda | ............ | G06K 15/4055 358/1.15 |
| 2014/0277769 A1* | 9/2014 | Matsuoka | .............. | G06Q 50/06 700/278 |
| 2015/0160670 A1* | 6/2015 | Meliopoulos | .......... | G01R 21/00 700/291 |

\* cited by examiner

POWERGRID OPERATION AND SUPERVISION SYSTEM

RELATED APPLICATION

This application claims priority to U.S. Provisional Application No. 61/954,563, filed 17 Mar. 2014, and entitled "eBoss-eterra Business Operation and Supervision Suite," the entirety of which is incorporated herein by reference.

TECHNICAL FIELD

The subject specification generally relates to an operation and supervision system, and, more particularly, to managing operations of a power transmission and distribution grid.

BACKGROUND

Electrical grids, both transmission and distribution, are extremely intricate and dynamic systems, that require many different tasks and work processes to efficiently and effectively manage. In addition to performing the core switching duties, power grid operators forecast supply and demand, perform capability estimates, schedule outages, obtain clearances, plan daily operations, and log all activity. These operations are all performed on different work-flows requiring operators to keep track of several systems that are independent of each other.

The above-described deficiencies of today's systems are merely intended to provide an overview of some of the problems of conventional systems, and are not intended to be exhaustive. Other problems with the state of the art and corresponding benefits of some of the various non-limiting embodiments may become further apparent upon review of the following detailed description.

SUMMARY

The following presents a simplified summary of the various embodiments in order to provide a basic understanding of some aspects described herein. This summary is not an extensive overview of the disclosed subject matter. It is intended to neither identify key or critical elements of the disclosed subject matter nor delineate the scope of the subject embodiments. Its sole purpose is to present some concepts of the disclosed subject matter in a simplified form as a prelude to the more detailed description that is presented later.

In accordance with various aspects, the disclosed subject matter can comprise a system for facilitating operation and monitoring of a power grid. The system can include a processor and a memory that stores executable instructions that, when executed by the processor, facilitate performance of operations. The operations can include generating an operation plan for planned outages, wherein the planned outages are determined to satisfy a defined criterion associated with an effect on system operation of the power grid system, and wherein the operation plan is based on a predicted operating condition of the power grid system. The operations can also include determining an action plan based on the operation plan, wherein the action plan comprises a set of tasks to be performed to accomplish the operation plan. The operations can also include facilitating execution of switching management operations by transmitting instructions associated with the set of tasks to an energy management system and a distribution management system. The operations can also include maintaining a log record of the set of tasks, the instructions, and task completion times associated with the set of tasks.

In accordance with various other aspects, the disclosed subject matter can comprise a method to supervise operation of a power grid, where the method comprises receiving, by a system comprising a processor, information associated with scheduled outages on the power grid system. The method can also include determining, by the system, that a scheduled outage of the scheduled outages satisfies a predefined criterion relating to an effect on system operation of the power grid system. The method can also include generating, by the system, an action plan based on an expected operating condition of the power grid system and the scheduled outage, wherein the action plan comprises a task to be performed to accomplish the action plan. The method can also include managing, by the system, execution of a switching management operation by transmitting an instruction to an energy management system and a distribution management system, wherein the instruction relates to the task and logging, by the system, the task, the instruction, and a completion time of the task.

In accordance with still other aspects, the disclosed subject matter can comprise a non-transitory computer readable storage medium having executable instructions that, in response to execution, cause a system comprising a processor to perform operations. The operations can include receiving information associated with scheduled outages on a power grid and determining that a scheduled outage of the scheduled outages satisfies a predefined criterion relating to an effect on system operation of the power grid. The operations can also include generating an action plan based on an expected operating condition of the power grid and the scheduled outage, wherein the action plan comprises a task to be performed to accomplish the action plan. The operations can also include managing execution of a switching management operation by transmitting an instruction to a energy management system and a distribution management system, wherein the instruction relates to the task and logging the task, the instruction, and a task completion time.

The following description and the annexed drawings set forth in detail certain illustrative aspects of the disclosed subject matter. These aspects are indicative, however, of but a few of the various ways in which the principles of the various embodiments may be employed and the disclosed subject matter is intended to include all such aspects and their equivalents. Other advantages and distinctive features of the disclosed subject matter will become apparent from the following detailed description of the various embodiments when considered in conjunction with the drawings.

DETAILED DESCRIPTION

Figure 1:
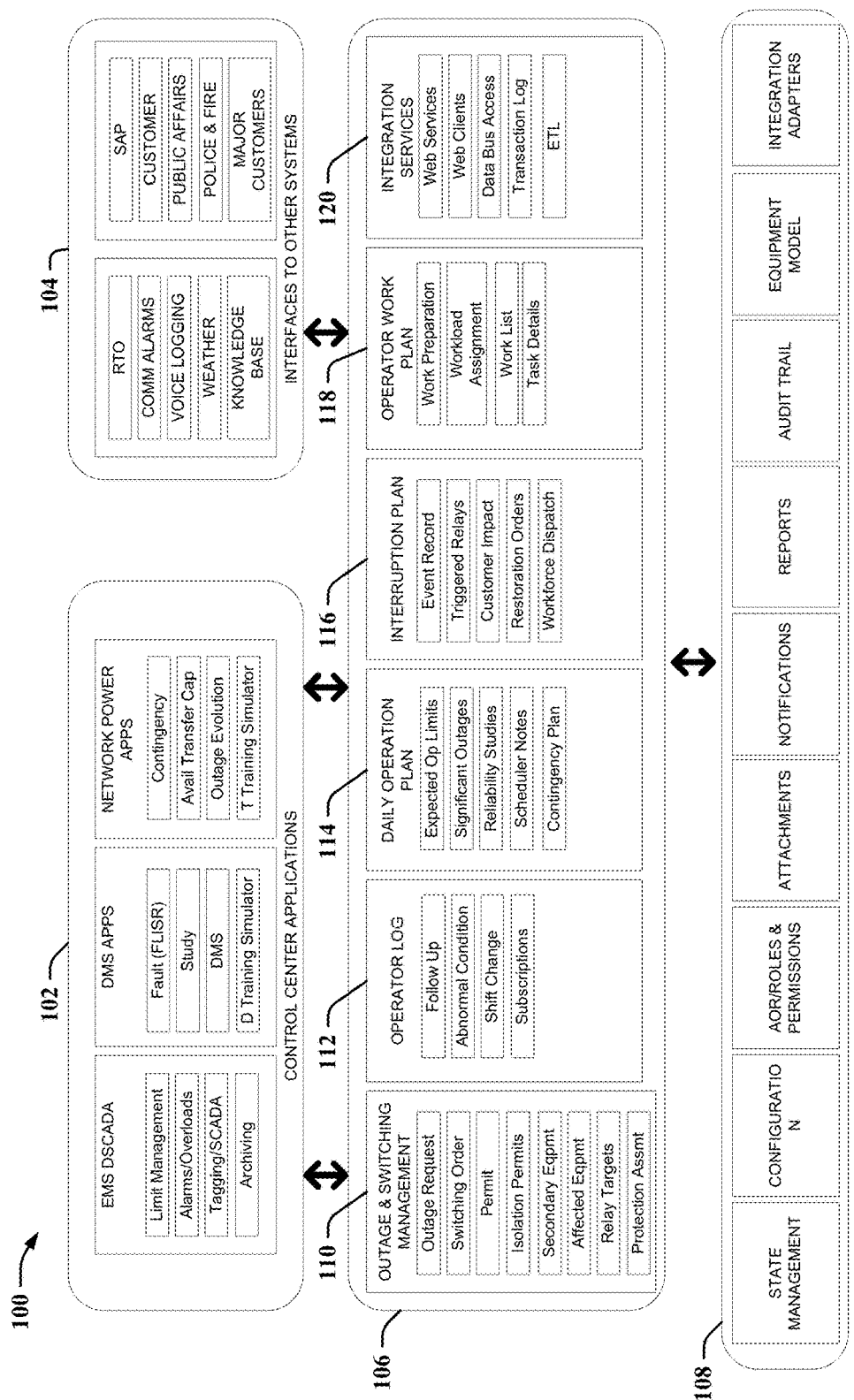
FIG. 1 is an example embodiment of a system architecture that facilitates supervision and operation of a power grid in accordance with aspects of the subject disclosure.

The disclosed subject matter is described with reference to the drawings, wherein like reference numerals are used to refer to like elements throughout. In the following description, for purposes of explanation, numerous specific details are set forth in order to provide a thorough understanding of the various embodiments of the subject disclosure. It may be evident, however, that the disclosed subject matter may be practiced without these specific details. In other instances, well-known structures and devices are shown in block diagram form in order to facilitate describing the various embodiments herein.

As used in this application, the terms "component," "system," "platform," "interface," "node", "source", "agent", and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Various aspects of the disclosure provide for an integrated system to facilitate operational and supervisory functions for transmission and distribution power grids. The system can facilitate switching operations for the power grid as well as providing an integrated planning, scheduling, and logging of power grid supervisory functions in order to reduce human error, improve labor efficiencies, and provide tools to assist in daily work plan assignments. The system includes modules to assist with outage and switching management, as well as modules for daily operation planning, work assignment planning, interruption tracking and analysis, and logging and recordkeeping.

The systems and methods disclosed herein provide the tools to allow grid operators to efficiently manage and supervise the power grid. The electric grid complexity has increased dramatically over the years due to the installation and introduction of solar and other renewable distributed generation sources, smart grid technologies, demand response, smart meters, synchophasors, relay applications and advanced control center applications for both transmission and distribution. To manage the new grid complexity, applications to manage the functionality of the control center, applications have been developed to measure, analyze, operate, and manage the systems used for distribution and transmission.

Until now however, these applications have all been implemented on disparate systems, and due to the different technologies and processes it has not been possible to unify these systems. Thus, grid operators have had to manually process switching requests, initiate work, provide daily and weekly reports, place and receive calls with people to validate assignments to switching orders, process switching orders, validating clearances, and noting maintenance or engineering items to be reviewed by other departments. The system and methods disclosed herein provide for a supervisory and operational system that is able to perform all of these tasks and functions in a single unified system.

Referring to the drawings, FIG. 1 is a block diagram of an example system architecture 100 that facilitates supervision and operation of a power grid in accordance with aspects of the subject disclosure.

Supervision and operation system 106 can facilitate operational and supervisory functions for transmission and distribution power grids by interfacing and integrating with existing energy management systems (EMS) and distribution management systems (DMS) control applications 102, and other interfaces 104 to other systems. In order to facilitate the operational and supervisory functions, supervision and operation system 106 can utilize common foundation core features 108.

The common foundation core features 108 include common core features and functions for all the modules of the supervision and operation system 106. Common core features and functions can include state management functions that include a collection of template process and life cycle states to manage the lifecycles of each business object. The core features and functions 108 can also include configuration processes that provide definitions of data fields, data validation rules, valid actions, checklists, and state transitions for each object type and each object state. The core features 108 can also include access control features that provide definitions and management of areas of responsibility (AOR) roles, permissions, and user management.

The core features 108 can also provide support for attachments to capture evidence, references to external system records, uniform resource locators (URLs) to external systems and knowledge bases and references to reports. Additionally, common support for issuing notification to users and stakeholder to notify them on status changes and new or completed tasks in the system. Furthermore, core features 108 can include a user interface that is common to multiple power grid operators and users, that includes a single sign on process and provides access across the web for external parties and can be integrated into the operator console as part of the control center applications.

The core features 108 can further include reporting functionality that provides definitions, execution, distribution and access to reports across all the modules, equipment types, area of responsibility, and operator functions. The reporting subsystem allows users to analyze business operation data and provide view summaries of across equipment types, network areas, and areas of responsibility. The reporting tool is also used to generate detail reports and signed paper copies that can be distributed to personnel.

The core features 108 can also provide functionality for an audit trail by auditing and logging all actions, data changes, state changes, and both inbound and outbound communications. The core features 108 can also provide management and integration of the equipment common model and other integration adapters.

In an embodiment, the supervision and operation system 106 can manage the control center applications 102 such as the EMS distribution supervisory control and data acquisition (DSCADA) systems which manage limit management, alarms and overloads, tagging/SCADA, and archiving. The DMS applications can include fault location, isolation and service restoration (FLISR), study applications, DMS, and distribution training simulators. Other network application that may be on disparate control centers that can be managed by the supervision and operation system 106 can include network power apps such as contingency planning, available transfer cap, outage evolution, and transfer training simulator.

The supervision and operation system 106 can also manage interfaces to other systems 104 such as those systems belonging to regional transmission organizations, enterprise software such as SAP, voice logging software, alarm systems, weather forecast systems, knowledge base databases, customer systems, public affairs, and police and fire system.

To accomplish these tasks, supervision and operation system 106 can include several modules that provide functionality and/or perform workflow processes. These modules can include an outage and switching management module 110, an operator log module 112, a daily operation plan module 114, an interruption plan module 116, an operator work plan 118, and an integration services module 120.

The outage and switching management module 110 can be responsible for the request, validation, study, scheduling, implementation, and verification of outage and switching requests, with a strong emphasis in automation, safety and integration with SCADA and power analysis. The outage and switching management module 110 can include components that request outages, manage switching orders, manage and request permits, isolation permits, manage secondary equipment and affected equipment, provide functionality for relay targets and protection assessments.

The operator log module 112 can responsible for assisting the operator to register and follow events in the system, register abnormal conditions and deviations from the operation plan, and management of the handoff of the work at the beginning of the operator shift. The operator log module 112 can include components that perform followup logging, track abnormal conditions, track personnel and shift changes, and also manage subscriptions for automatic logging.

The daily operation plan module 114 can determine daily plans for power grid operators to manage the power grid and can include components that plan and estimate expected operation limits for the power grid, collect lists of significant outages, collect and track reliability studies, collect scheduler notes, and can also generate and maintain references to contingency plans based on various triggering events/factors.

The interruption plan module 116 can be used to maintain a comprehensive log of forced events, to capture the references to the alarms that where captured, the estimation of the number of affected customers, the records of dispatch orders to repair crews, and the analysis and list of triggered relays. The interruption plan module 116 can include components that maintain event records, track and list triggered relays, determine customer impact, track restoration orders, and track records of workforce dispatching.

The operator work plan module 118 can be used to prepare the work for the day, ensure that the list of preparation tasks is completed before the operating day, analyze and assign workloads, manage the list of tasks for a day, and edit, annotate and complete each task as is performed, reassigned or cancelled.

The integration services module 120 can include specialized components that are used to capture data from external systems, and to receive data from external systems and initiate processes, extract data internal systems, initiate processes in external systems, and to follow up on work initiated in external systems.

Figure 2:
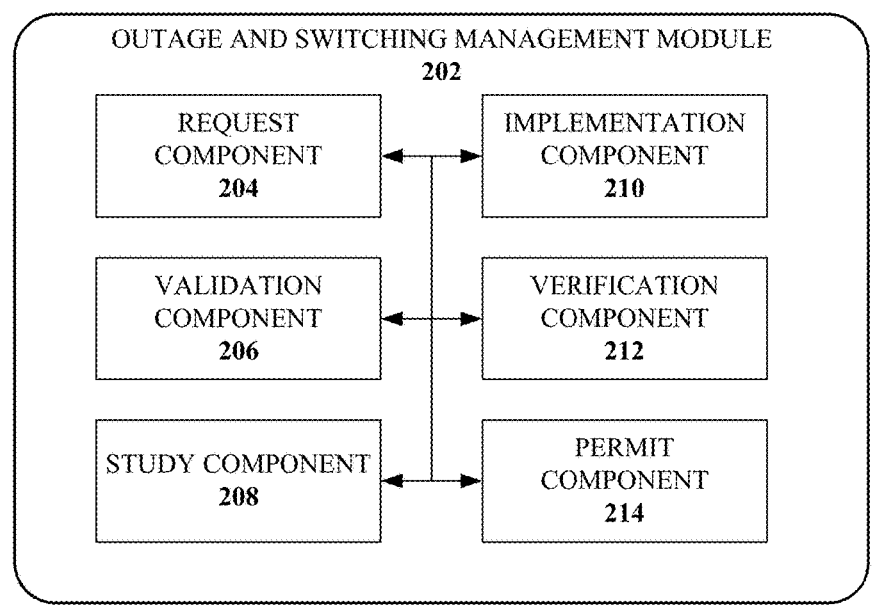
FIG. 2 is an example embodiment of a system that facilitates outage and switching management of a power grid in accordance with aspects of the subject disclosure.

Turning now to FIG. 2, illustrated is an example embodiment of a system 200 that facilitates outage and switching management of a power grid in accordance with aspects of the subject disclosure. An outage and switching management module 202 (e.g., similar to outage and switching management module 110) can be provided to manage and supervise the request, validation, study, scheduling, implementation, and verification of outage and switching requests.

The outage and switching management module 202 can include a request component 204 that is configured to facilitate and to provide tools for creation and submission of equipment outage requests. The process enables process control and notification of the status of each outage and ensures proper tracking and auditing of all changes.

A validation component 206 can be provided to check, verify, and approve the equipment outage requests, and other switching steps that will de-energize, or isolate a portion of the power system, establish a safety clearance in preparation for new construction, maintenance, or repair work. A verification component 212 can be provided to interface with the EMS system and facilitate automatic generation of tags, switching of equipment, verification of measurements and capturing of data.

An implementation component 210 can send an instruction or authorization to initiate the equipment outage or switching order to the relevant EMS or DMS system. The implementation component 210 can also manage the reverse process required to energize a new component of the power system or restore the power system in the event of a component failure (Emergency Restoration Switching). In an embodiment, the implementation component 210 can also schedule the requests. The permit component 216 can be provided to ensure the selection of switchman based on valid and up to date switching qualifications and training. The permit component 214 can also manage and track the process required to create, issue, transfer, release and close the authorizations to work that has to be granted to a field supervisor once the safety clearance is established, before allowing the crew to perform any work in the field.

A study component 208 can be provided to facilitate analysis in changes in the power flow due to outages, and to analyse the changes in the protection scheme as a result of the new configuration. The study component 208 can assist the power grid operator to refer to the results of both the power flow studies and the protection studies required to support the reconfiguration of the relay targets.

Figure 3:
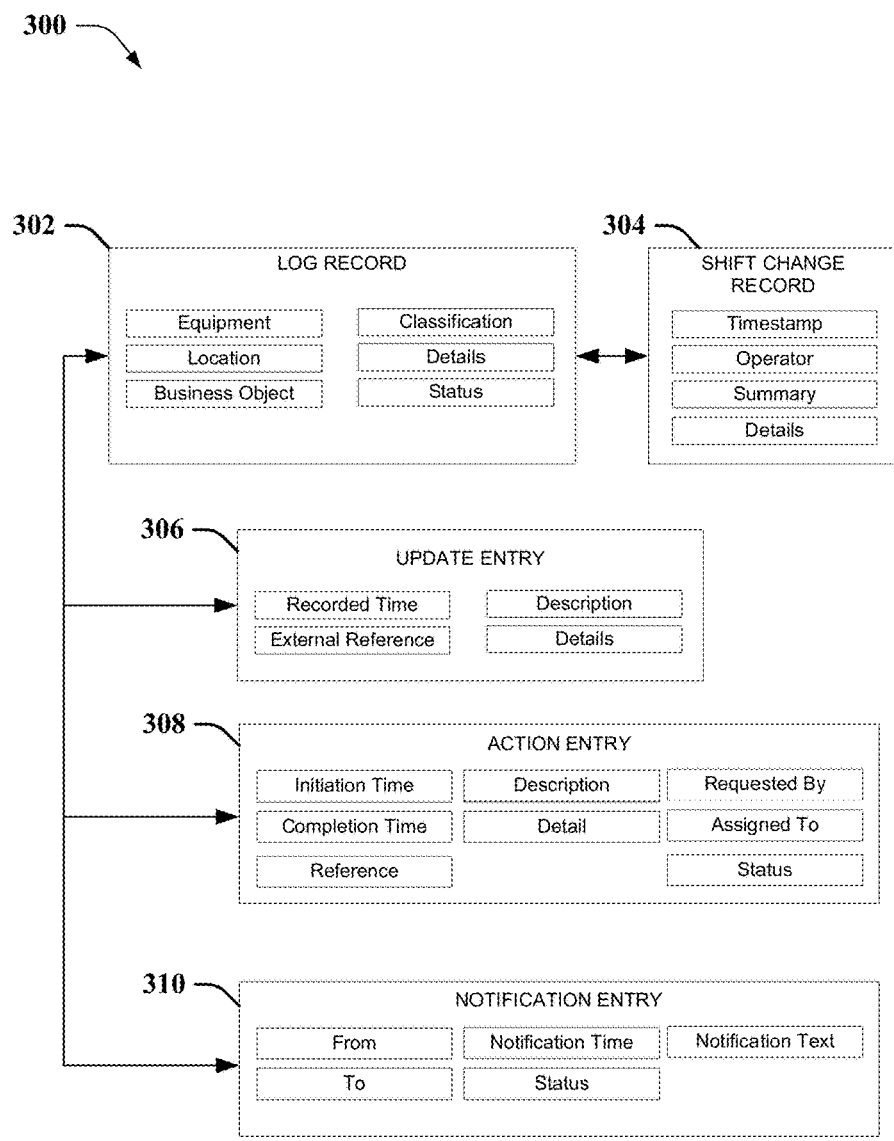
FIG. 3 is an example embodiment of a system architecture that facilitates logging of actions associated with power grid operations in accordance with aspects of the subject disclosure.

Turning now to FIG. 3, illustrated is an example embodiment of a system architecture 300 that facilitates logging of actions associated with power grid operations in accordance with aspects of the subject disclosure. The system 300 provides a high level overview of the tasks and workflows associated with the operator log module 112.

A log record 302 is created by the operator log module 112 when a new event, incident or abnormality is manually detected (for example as a result of a phone call), or when a new actions is recorded automatically by the system (for example when a switching operations is initiated). The log record 302 provides a log of the time the record was created and the operator who created it. Moreover, it provides for the determination of the equipment, area or station affected, the location of the event, the summary and details of the event. In addition, it provides for a number of classification fields for later reporting, and a reference to the event to which the record is related to (EMS Alarm, OSM Request or Switching Operation, Phone Call, or nothing at all). Finally, the log record 302 provides for tracking of the status of the process required to close the log record 302.

The operator log module 112 can also perform entry updates at 306, where the log record 302 is updated to log updates to the original event as well as annotations and observations to the original event. These can include the recorded time of the updates, external references, descriptions of the event and/or update and other details.

The operator log module 112 can also maintain action entries 308 which are part of the log record 302 used to initiate and record decisions and actions made by the operator, as well as actions initiated by the operator in other systems or assigned to other people. The action entries are used to track the initiation, status and completion of those actions, determine the person and system that is responsible to complete the action, as well as to keep references to the details of these actions in other systems.

The operator log module 112 can also maintain notification entries 310 which are part of the log record 302 and are used to keep track of the communication and notifications issued automatically by the system, or registered manually by the operator. This entry is used to record the verbiage used when receiving or sending notifications from or to external parties.

The operator log module 112 can also maintain shift change records 304 which are used by the operator to hand off work from one shift to another, and provides the next operator with all the information required to continue the system operation without hiccups. The shift change record 304 can provide a contextual summary of the outstanding issues, main decisions and recommendations that one operator needs to collect at the end of the shift.

Figure 4:
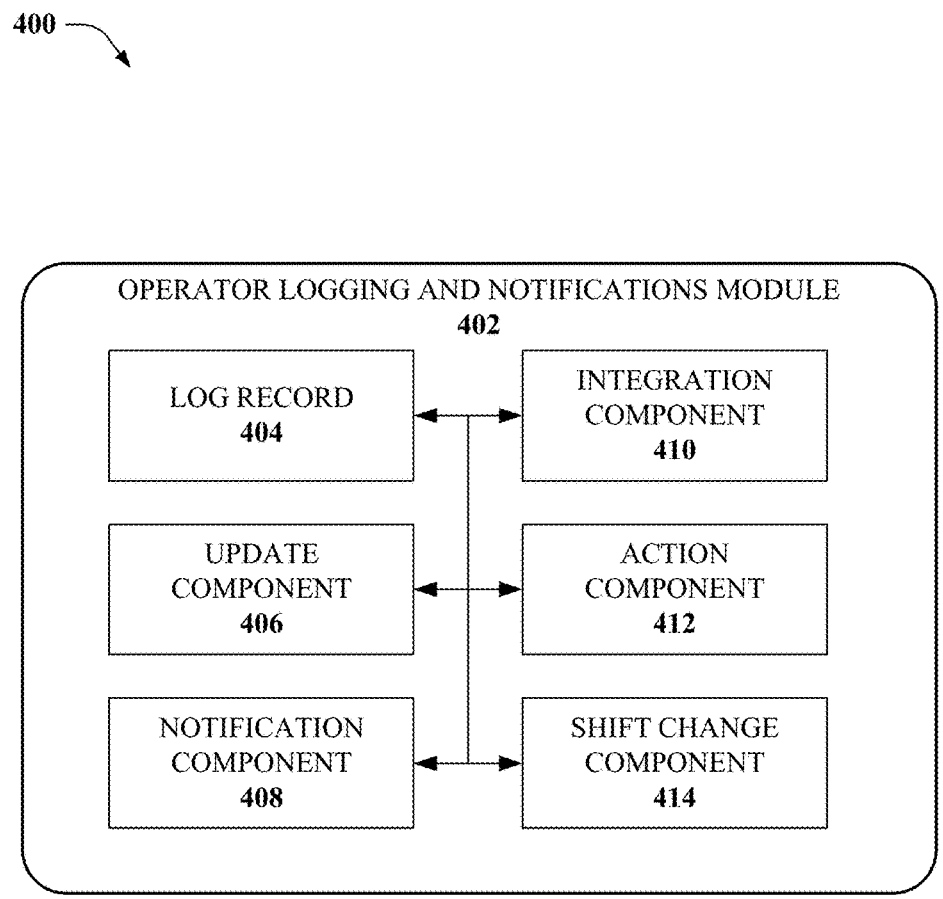
FIG. 4 is an example embodiment of a system that facilitates logging of power grid operations in accordance with aspects of the subject disclosure.

Turning now to FIG. 4, illustrated is an example embodiment of a system 400 that facilitates logging of power grid operations in accordance with aspects of the subject disclosure. The system 400 can include an operator logging and notifications module 402 (e.g., the operator log module 112) that provides for a daily chronological record used to capture the events and incidents of the day, and record updates and follow ups, record when work is requested from other departments, when people are notified, when NERC instructions are followed, and to record actions and decisions made by operators and management, so that the entire record can be used as audit and legal evidence.

The operator logging and notifications module 402 can include a log record component 404 configured to maintain a log record of the list of tasks, instructions, and task completion times associated with the list of tasks. An update component 406 can be configured to record updates and actions associated with the list of tasks. A notification component 408 can be configured to keep track of the communication and notifications issued automatically by the system, or registered manually by the operator. In an embodiment, the notifications can be received from devices or systems associated with the EMS DSCADA and DMS systems. The notification component 408 can record the exact verbiage used when receiving or sending notifications from or to external parties.

An action component 412 can be provided to initiate and record decisions and actions made by the operator, as well as actions initiated by the operator in other systems or assigned to other people. The action entries are used to track the initiation, status and completion of those actions, determine the person and system that is responsible to complete the action, as well as to keep references to the details of these actions in other systems.

A shift change component 414 can be provided to maintain shift change records which are used by the operator to hand off work from one shift to another, and provides the next operator with all the information required to continue the system operation without hiccups. The shift change records can provide a contextual summary of the outstanding issues, main decisions and recommendations that one operator needs to collect at the end of the shift.

An integration component 410 can be provided to interface with EMS DSCADA and DMS systems and other applications that are used to provide updates, alarms, notifications, and shift change records. The integration component 410 can also be configured to create and remove equipment information tags from operator log actions and can integrate schedule information for repair work and other activities into the operator log.

Figure 5:
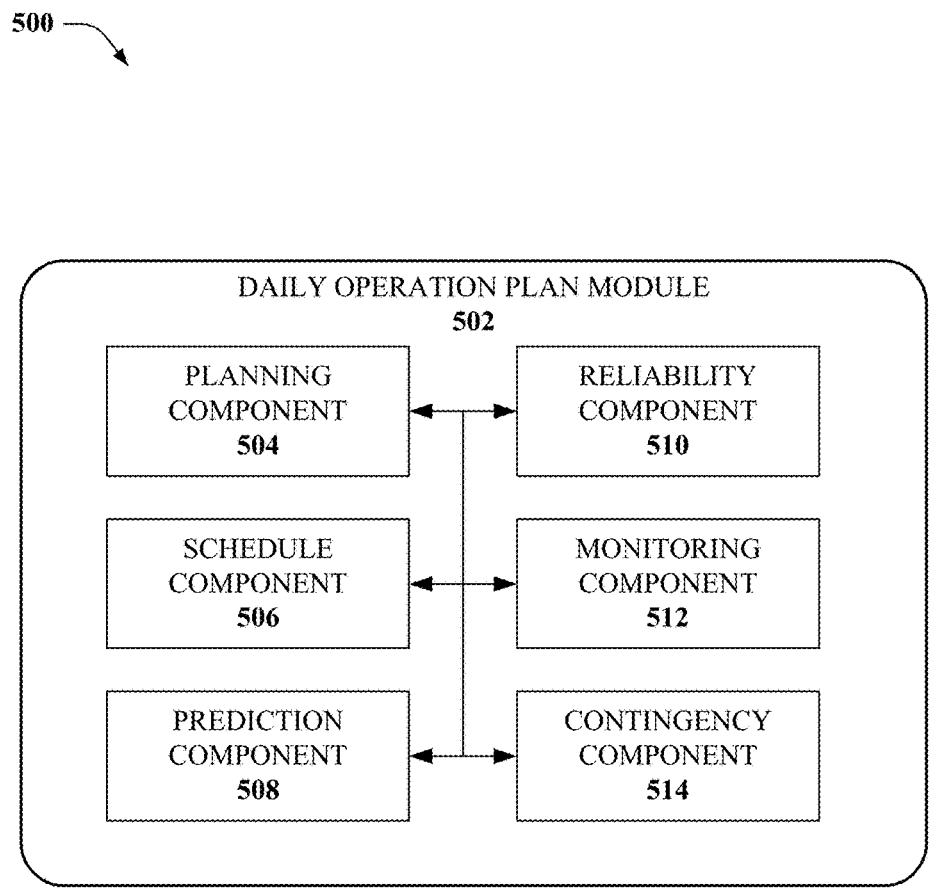
FIG. 5 is an example embodiment of a system that performs daily operational planning of power grid operations in accordance with aspects of the subject disclosure.

Turning now to FIG. 5, illustrated is an example embodiment of a system 500 that performs daily operational planning of power grid operations in accordance with aspects of the subject disclosure. The system 500 can include a daily operation plan module 502 (e.g., the daily operation module 114) that captures the expected operating conditions of the power grid for a predetermined time period (e.g., a shift or a day) in order to generate an operation plan for planned outages, wherein the planned outages are determined to satisfy a predetermined criterion associated with an effect on system operation of the power grid, wherein the operation plan is based on an predicted operating condition of the power grid.

A planning component 504 can be provided to generate the operation plan once the required information has been gathered. The planning component 504 can base the operation plan on planned outages and expected operating conditions of the power grid. In an embodiment, the planning component 504 can take into account planned outages that have a large impact on the system operation or on one or more customers. The planning component 504 can determine whether the outage has a significant effect on the power grid or the customers based on the number of customers affected, based on the monetary impact of the power outages, and other similar factors. If the power outage has an effect above a predetermined threshold, the planning component 504 can incorporate the planned outage in the operation plan. In an embodiment, the prediction component 508 can be configured to predict the effect on the power grid. The prediction component can also predict expected operation limits, load, generation and interchange. The predictions can be recorded and compared to the actual operation flows determined by a monitoring component 512 to analyze current outages.

A schedule component 506 can be provided to record notes for operations schedulers on subsequent days, or be used to access notes from previous days. The notes can provide any special instructions and comments regarding the expectations on how the system would operate. A reliability component 510 can be provided to access references to reliability studies done during the planning period for the operating day, and are used for reference and comparison during the actual operation.

The monitoring component 512 can also keep track of current conditions, and if a planned outage that was determined to have a significant impact on the power grid is determined to no longer have a significant impact due to changing conditions, the planning component 504 can remove the planned outage from the operation plan.

The contingency component 514 can prepare, ahead of time, plans based on based on the credible most important contingencies, and used as an alternative action and operation plan if an unexpected incident occurs during the day.

Figure 6:
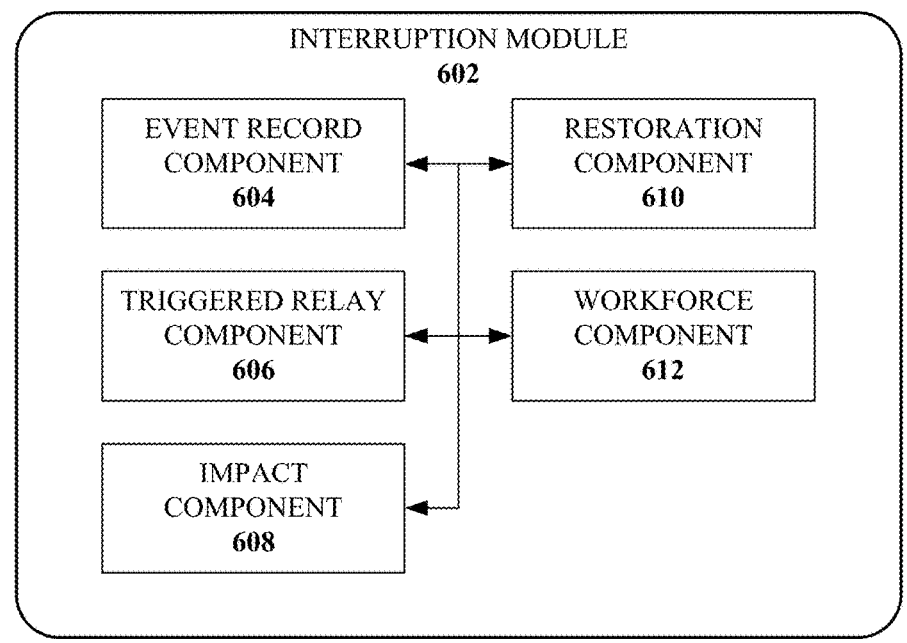
FIG. 6 is an example embodiment of a system that tracks interruptions of power grid operations in accordance with aspects of the subject disclosure.

Turning now to FIG. 6, illustrated is an example embodiment of a system 600 that tracks interruptions of power grid operations in accordance with aspects of the subject disclosure. The system 600 can include a interruption module 602 (e.g., the interruption plan module 116) that manages gathering of the information required to determine the reasons and effects of interruptions and capturing the actions and sequence of events required to restore the system back to normal grid operations. The interruption module 602 can collect an interruption record comprising information associated with cause and effects of an interruption to a normal operation of the power grid, wherein the information comprises information collected from a supervisory control and data acquisition alarm system (e.g., an EMS DSCADA system).

An event record component 604 can be provided to collect information (the event record) about an interruption, and collect the information about the process required to recover from it. The event record is used to identify the original cause of the interruption and identify the references to the alarms that originally detected the event from in the SCADA alarm system. Event records can be also manually created by the operator as a result of an external notification, such a phone call, and are manually used to update the status of equipment in the non-monitored part of the system. Each incident captures information such as the affected area/station, reason for the outage, start time, EMS state, customer's impact, and work force dispatch.

A triggered relay component 606 can be provided to identify relays that are triggered as part of the interruption. The list can used to verify the proper performance of the protection scheme and to verify that the correct relays operated in the correct order. The list of triggered relays is identified from the SCADA alarm system and must be verified before the event record is completed.

An impact component 608 can be provided to qualify the effect of an interruption and estimate the number of affected customers and the duration of their interruptions. A restoration component 610 can be provided to issue restoration switch orders which establish repair clearances and interruption restoration due to an interruption. And a workforce component 612 can be provided to record the decisions and requests made by the operator to assign and dispatch crews to the field to perform restorations and repairs, to keep track of the request completion and to monitor and record their progress throughout the repair work. The workforce component 612 can also initiate or facilitate initiation of dispatch orders sent to repair crews, and automates monitoring of the dispatch orders as their status changes in the external workforce system.

Figure 7:
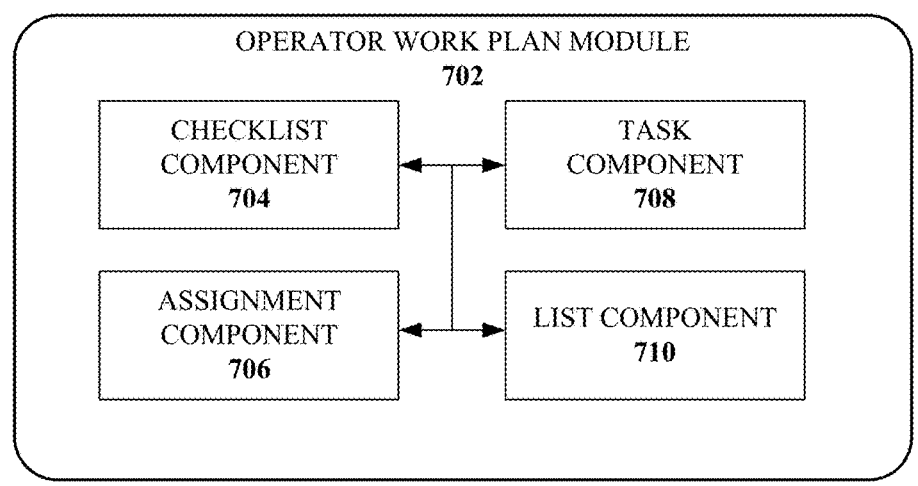
FIG. 7 is an example embodiment of a system that performs operator work planning of power grid operations in accordance with aspects of the subject disclosure.

Turning now to FIG. 7, illustrated is an example embodiment of a system 700 that performs operator work planning of power grid operations in accordance with aspects of the subject disclosure. An operator work plan module 702 can facilitate planning of the specific work in an operator console based on the Daily Operation Plan. The operator work plan, which is the list of tasks to be performed, or an action plan, can be prepared ahead of time based on the scheduled work and the expected operating condition for the operating day. The expected operating condition can include expected operation limits, load, and generation capacity, actual or predicted, for the power grid.

A checklist component 704 can be provided to generate the list of tasks that need to be completed before a work item can be scheduled for execution. The checklist depends on the nature of the work to be completed. If the task is a switch order, for example, the corresponding power study must be completed, the crew schedule must be checked and the switchman must be scheduled. The checklist is used to verify that these tasks are completed ahead of time so that the switch order can be implemented as planned. An assignment component 706 can be provided to balance the workload in each desk ahead of time, by estimating the duration of each task and balancing the load across the operators. The assignment component 706 can also manage the changes in the staff as the size of a shift changes between day and night. The assignment component 706 can also be used to verify and book the capacity of the operator staff when approving switching operations ahead of time.

A task component 708 can be provided to facilitate access to the details of a task and access to the correct module in where the work needs to be performed, and allows the operator to record the initiation, completion, cancellation, or reassignment of a task. A list component 710 can be provided to facilitate presentation of the tasks that the operator is scheduled to complete and show the status of the tasks as they are initiated, performed, cancelled or become overdue. The task list may show the list of switching orders to execute, the list of permits that need to be issued, the list of crew dispatches that need follow up, the list of interruptions that are pending completion.

Figure 8:
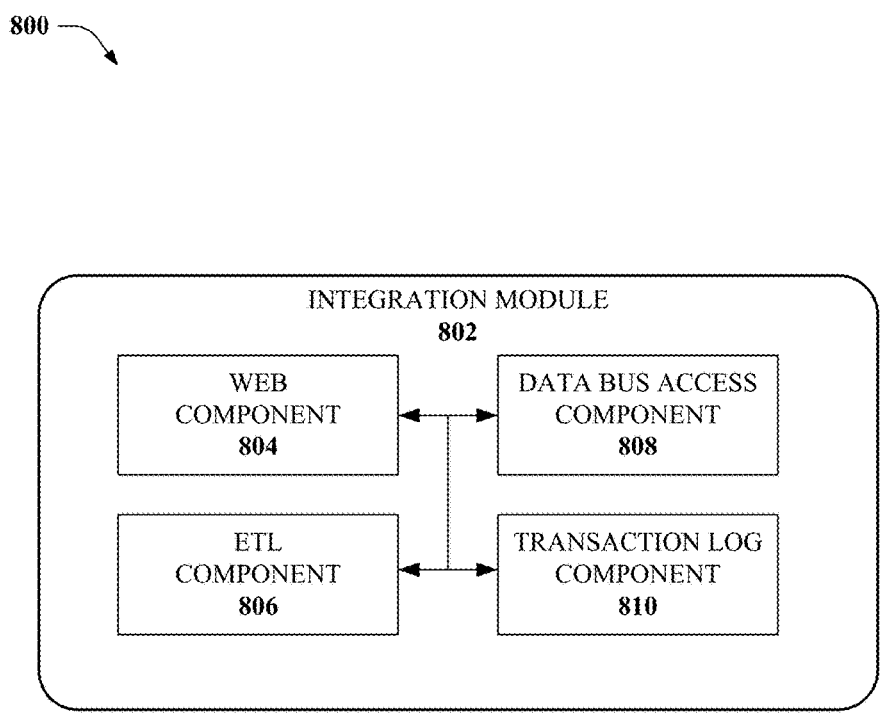
FIG. 8 is an example embodiment of a system that facilitates integration of disparate systems and application modules associated with power grid operations in accordance with aspects of the subject disclosure.

Turning now to FIG. 8, illustrated is an example embodiment of a system 800 that facilitates integration of disparate systems and application modules associated with power grid operations in accordance with aspects of the subject disclosure. An integration module 802 can be provided to allow each of the modules to communicate with each other and also to access external systems and to provide electronic visibility to external systems of the objects, statuses, and actions. A web component 804 can be provided to facilitate each module accessing a set of web service points that authorized clients can use to access data thru an automated API. An extract, transform, and load (ETL) component 806 can be provided to move bulk data between databases at periodic intervals. A Batch Scheduler ETL manager is used to schedule the work and capture errors during bulk data transfers. A data bus access component 808 can be provided to subscribe to an Integration Data Bus compliant with the J2EE standards. A transaction log component 810 can be provided to facilitate transaction logging of all data transfers through the module.

Figure 9:
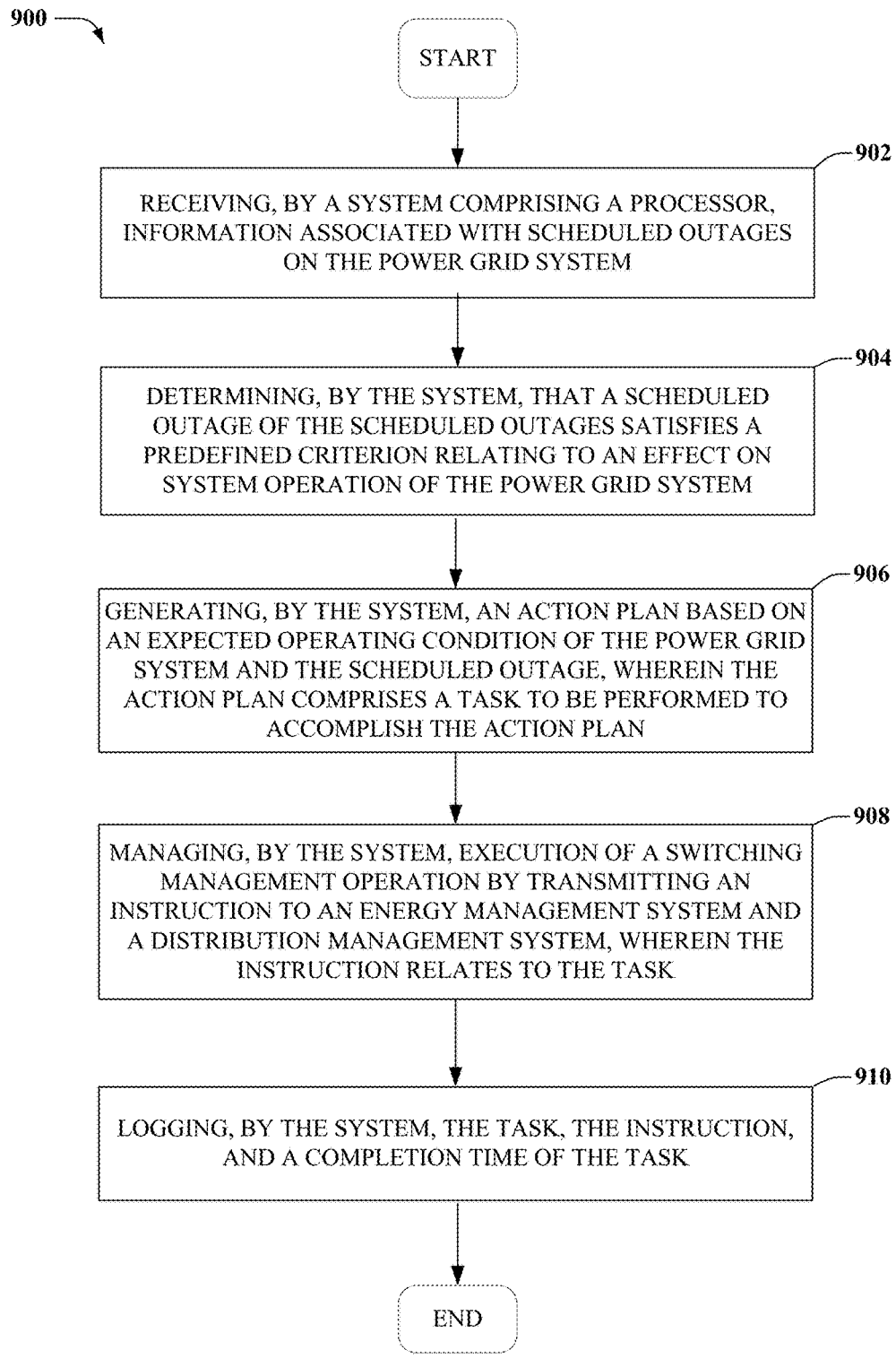
FIG. 9 illustrates an exemplary method for supervising power grid operations in accordance with aspects of the subject disclosure.

FIG. 9 illustrates a process in connection with the aforementioned systems. The process in FIG. 9 can be implemented for example by systems 100-600 as illustrated in FIGS. 1-8 respectively. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

FIG. 9 illustrates a flow diagram of a method 900 for supervising power grid operations in accordance with aspects of the subject disclosure. The method 900 can begin at 902, where the method comprises receiving, by a system comprising a processor, information associated with scheduled outages on the power grid system. At 904, the method can include determining, by the system, that a scheduled outage of the scheduled outages satisfies a predefined criterion relating to an effect on system operation of the power grid system. At 906, the method can include generating, by the system, an action plan based on an expected operating condition of the power grid system and the scheduled outage, wherein the action plan comprises a task to be performed to accomplish the action plan. At 908, the method can include managing, by the system, execution of a switching management operation by transmitting an instruction to an energy management system and a distribution management system, wherein the instruction relates to the task. At 910, the method clan include logging, by the system, the task, the instruction, and a completion time of the task.

Figure 10:
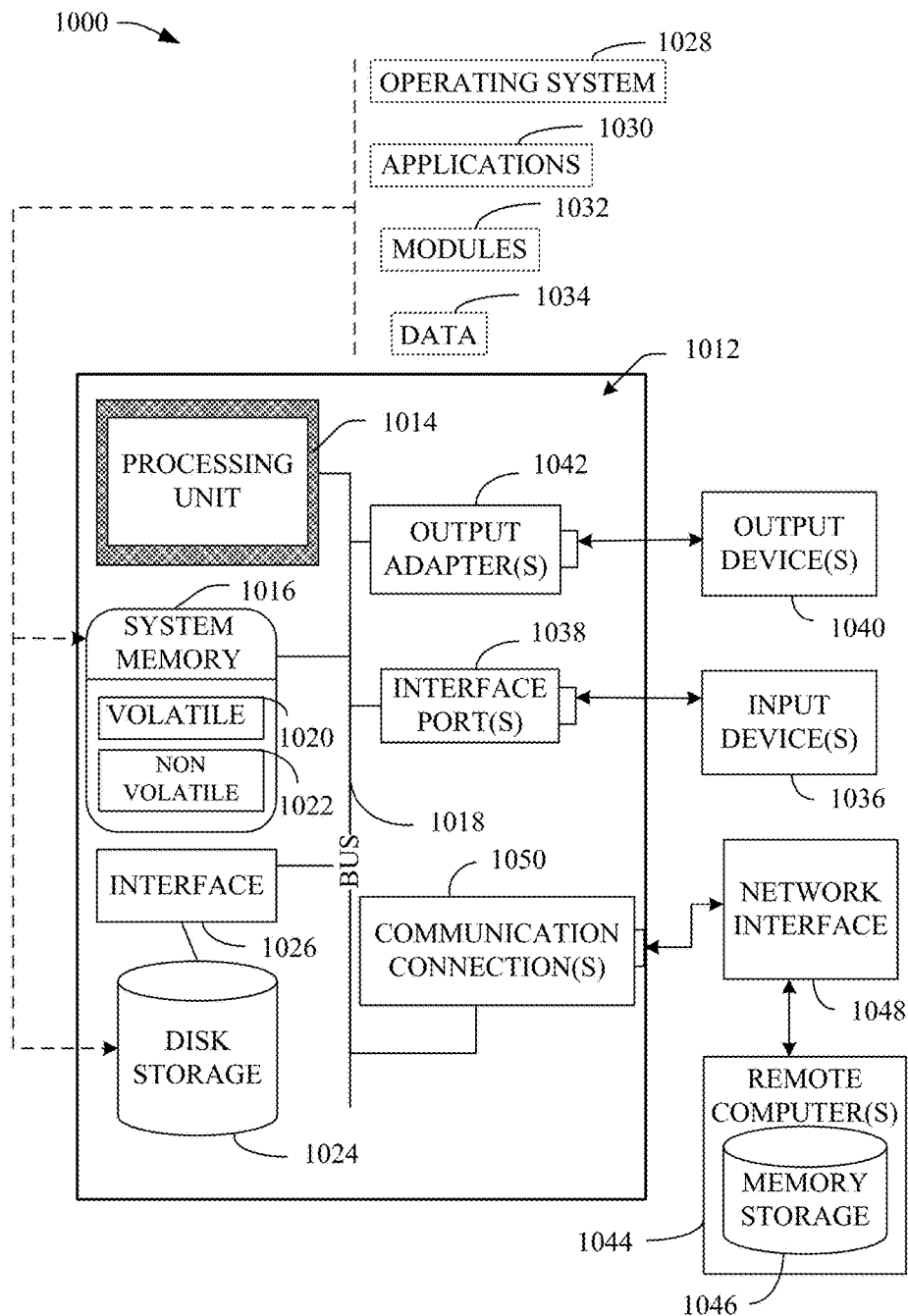
FIG. 10 is a schematic block diagram illustrating a suitable operating environment.
Figure 11:
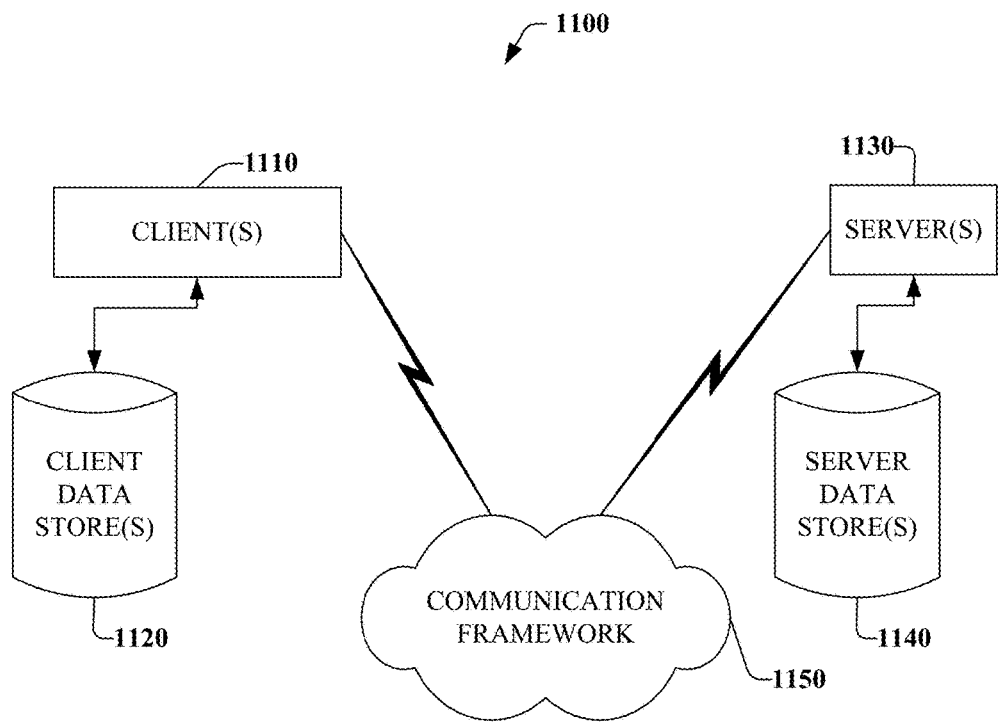
FIG. 11 is a schematic block diagram of a sample-computing environment.
Figure 12:
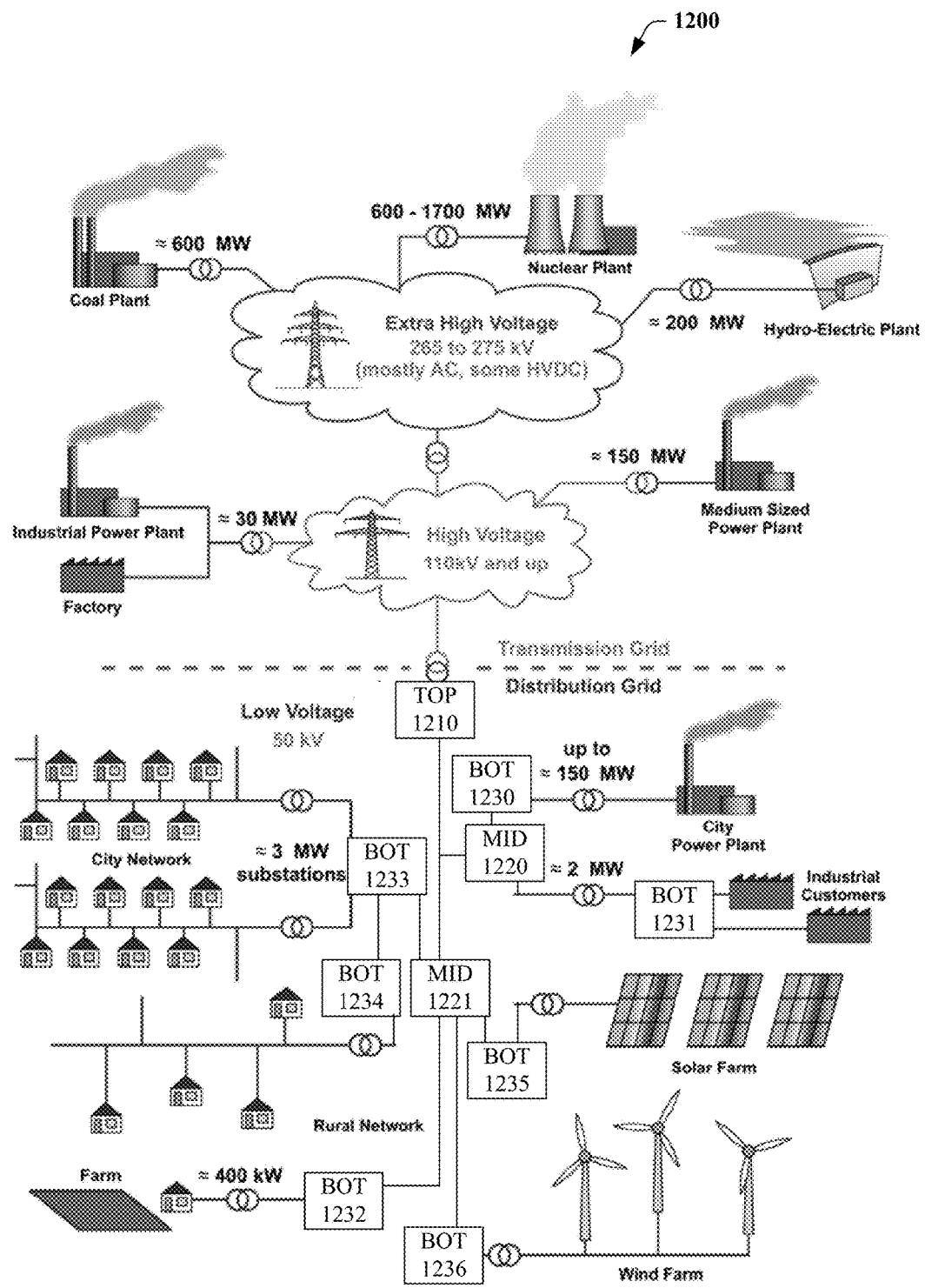
FIG. 12 depicts a diagram of an example electrical grid environment in which the various aspects of the disclosed subject matter can be practiced.

In order to provide a context for the various aspects of the disclosed subject matter, FIGS. 10-12 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the disclosed subject matter also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., personal digital assistant (PDA), phone, watch), microprocessor-based or programmable consumer or industrial electronics, and the like. The illustrated aspects may also be practiced in distributed computing environments where tasks are performed by remote processing devices that are linked through a communications network. However, some, if not all aspects of the disclosed subject matter can be practiced on stand-alone computers. In a distributed computing environment, program modules may be located in both local and remote memory storage devices.

With reference to FIG. 10, a suitable environment 1000 for implementing various aspects of the disclosed subject matter includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), or flash memory. Volatile memory 1020 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 also includes removable/non-removable, volatile/non-volatile computer storage media. FIG. 10 illustrates, for example, a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used, such as interface 1026.

It is to be appreciated that FIG. 10 describes software that acts as an intermediary between users and the basic computer resources described in the suitable operating environment 1000. Such software includes an operating system 1028. Operating system 1028, which can be stored on disk storage 1024, acts to control and allocate resources of the computer system 1012. System applications 1030 take advantage of the management of resources by operating system 1028 through program modules 1032 (e.g., 110, 112, 114, 116, 118, 120, and etc.) and program data 1034 stored either in system memory 1016 or on disk storage 1024. It is to be appreciated that the claimed subject matter can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

FIG. 11 is a schematic block diagram of a sample-computing environment 1100 with which the subject specification can interact. The system 1100 includes one or more client(s) 1110. The client(s) 1110 can be hardware and/or software (e.g., threads, processes, computing devices). The system 1100 also includes one or more server(s) 1130. Thus, system 1100 can correspond to a two-tier client server model or a multi-tier model (e.g., client, middle tier server, data server), amongst other models. The server(s) 1130 can also be hardware and/or software (e.g., threads, processes, computing devices). The servers 1130 can house threads to perform transformations by employing the disclosed subject matter, for example. One possible communication between a client 1110 and a server 1130 may be in the form of a data packet transmitted between two or more computer processes.

The system 1100 includes a communication framework 1150 that can be employed to facilitate communications between the client(s) 1110 and the server(s) 1130. The client(s) 1110 are operatively connected to one or more client data store(s) 1120 that can be employed to store information local to the client(s) 1110. Similarly, the server(s) 1130 are operatively connected to one or more server data store(s) 1140 that can be employed to store information local to the servers 1130.

FIG. 12 depicts a diagram of an example electrical grid environment 1200 in which the various aspects of the disclosed subject matter can be practiced. It is to be appreciated that this figure and the associated disclosure is presented as a non-limiting example to facilitate a general comprehension of one or more aspects of the disclosed subject matter in connection with hypothetical electrical grid assets. Further, while sample values and assets are illustrated for context, these same sample values and assets are non-limiting and should not be viewed as defining any narrowing of scope. Generally, the assets of FIG. 12 can be assigned to a transmission grid portion (upper portion of figure) or a distribution grid portion (lower portion of figure) as is typical in many electrical power grids worldwide. Transmission systems often are associated with very high AC voltages or even DC transmission of power. Transmission systems are generally presented in the context of delivering high power to regional distribution networks managed by a distribution grid entity.

The conventional electrical distribution grid, as disclosed herein, generally has a flat control structure with control being centralized in a distribution control center (DCC). In contrast, as illustrated in FIG. 12, a non-flat control topography can be employed in accord with the subject matter disclosed herein. In this non-limiting example, three tiers of electrical distribution control system components are illustrated. A top-level (e.g., upper level) control node 1210 (also referred to as TOP 1210) (e.g., comprising a top-level DNNC component and top-level PSBC) can be communicatively coupled to junior level control nodes (e.g., 1220 to 1236), which can comprise junior level DNNC components and junior level PSBCs. In FIG. 12, the interconnections illustrate a basic tree structure topology.

In an aspect, two mid-level control nodes 1220 (also referred to as MID 1220) and 1221 (also referred to as MID 1221) can be logically placed between the bottom-level (e.g., lower level) control node and the top-level control node 1210. Further, the several bottom-level control nodes, such as bottom-level control nodes 1230 through 1236 (also referred to as BOT 1230 through BOT 1236), can be associated with various edge assets. For example, bottom-level control node 1230 can be associated with a city power plant and bottom-level control node 1231 can be associated with a small group of industrial customers. Bottom-level control node 1230 and 1231 can be logically connected to top-level control node 1210 by way of mid-level control node 1220. As such, data and rules can be bubbled up (e.g., communicated upward in the hierarchy) or pushed down (e.g., communicated downward in the hierarchy) by way of this communication path. The bidirectional communication and closed loop control at each level (e.g., top, mid, and bottom) can facilitate improved electrical distribution grid performance. For example, where additional power is needed by the industrial customers associated with bottom-level control node 1231, control signals from mid-level control node 1220 can source more power from city power plant by way of bottom-level control node 1230 without directly involving the top-level control node 1210 or draining energy from the illustrated solar farm or wind farm.

Similarly, mid-level control node 1221 can be associated with bottom-level control node 1232 through 1236. Bottom-level control node 1233, for example, can be logically associated with a plurality of transformers service a portion of a city network. Further, for example, bottom-level control node 1234 can be associated with a single transformer as part of a rural network. Moreover, at bottom-level control node 1232, for example, the control node can be associated with a single consumer, such as the farm. The control nodes also can be associated with distributed power generation, for example bottom-level control node 1235 associated with a solar farm and bottom-level control node 1236 associated with a wind farm. As such, bidirectional communication between top-level control node 1210 and bottom-level control node 1232 through 1236 can be by way of mid-level control node 1221. As such, rules propagated for mid-level control node 1220 and associate child control nodes can be different from rules propagated for mid-level control node 1221 and associated child control nodes. Further, independent closed loop control can be affected, for example, at bottom-level control node 1234 and the associated rural customers without impacting bottom-level control node 1233 and the associated city network.

It is to be appreciated and understood that components (e.g., DNNC component, PDS, PSBC, junction node, sensor component, ECC, ECM, etc.), as described with regard to a particular system or method, can include the same or similar functionality as respective components (e.g., respectively named components or similarly named components) as described with regard to other systems or methods disclosed herein.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, etc.) to provide secure, reliable, fast wireless connectivity. A Wi-Fi network can be used to connect computers to each other, to the Internet, and to wireline networks (which use IEEE 802.3 or Ethernet). Wi-Fi networks typically operate in the unlicensed 2.4 and 5 GHz radio bands, at an 11 Mbps (802.11b) or a 54 Mbps (802.11a) data rate, for example, or with products that contain both bands (dual band), so the networks can provide real-world performance similar to the basic "10 BaseT" wireline Ethernet networks used in many offices.

In the subject specification, terms such as "data store," data storage," "database," and substantially any other information storage component relevant to operation and functionality of a component, refer to "memory components," or entities embodied in a "memory" or components comprising the memory. For example, information relevant to operation of various components described in the disclosed subject matter, and that can be stored in a memory, can comprise, but is not limited to comprising, subscriber information; cell configuration (e.g., devices served by an AP) or service policies and specifications; privacy policies; and so forth. It will be appreciated that the memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), phase change memory (PCM), flash memory, or nonvolatile RAM (e.g., ferroelectric RAM (FeRAM)). Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory (e.g., card, stick, key drive . . . ) or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

What has been described above includes examples of systems and methods that provide advantages of the disclosed subject matter. It is, of course, not possible to describe every conceivable combination of components or methodologies for purposes of describing the claimed subject matter, but one of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system for facilitating operation and monitoring of a power grid system comprising:
   a processor; and
   a memory that stores executable instructions that, when executed by the processor, facilitate performance of operations, comprising:
      determining a measured operating condition by monitoring one or more portions of the power grid system;
      generating an operation plan for planned outages, wherein the planned outages are determined to satisfy a defined criterion associated with an effect on system operation of the power grid system, wherein the operation plan is based on a predicted operating condition of the power grid system, wherein the predicted operating condition comprises a predicted operation limit for the one or more portions of the power grid system, and wherein the generating the operation plan comprises comparing the predicted operating limit for the one or more portions of the power grid system to the measured operating condition;
      determining an action plan based on the operation plan, wherein the action plan comprises a set of tasks to be performed to accomplish the operation plan;
      facilitating execution of switching management operations associated with the power grid system by transmitting instructions associated with the set of tasks to an energy management system and a distribution management system; and
      maintaining a log record of the set of tasks, the instructions, and task completion times associated with the set of tasks.

2. The system of claim 1, wherein the instructions comprise clearance switching request instructions and switching order instructions.

3. The system of claim 1, wherein the instructions are associated with managing equipment outage requests, and wherein the managing comprises, receiving requests, submitting the requests, verifying the requests, approving the requests, analyzing the requests, or scheduling the requests.

4. The system of claim 1, wherein the set of tasks comprises issuing a work authorization in response to determining that a safety clearance has been established.

5. The system of claim 1, wherein the operations further comprise:
   identifying equipment that is indirectly affected by an outage in response to the switching management operations.

6. The system of claim 1, wherein the facilitating the execution of the switching management operations further comprises extracting data relating to power grid usage and current conditions from a data store and simulating a scenario related to an outage request.

7. The system of claim 1, wherein the maintaining a log record further comprises recording updates and actions associated with the set of tasks.

8. The system of claim 1, wherein the maintaining a log record further comprises recording notifications received from devices associated with the energy management system and a distribution management system.

9. The system of claim 1, wherein the operations further comprise:
   determining that a planned outage of the planned outages no longer satisfies the defined criterion associated with an effect on system operation of the power grid system; and
   removing a task associated with the planned outage from the set of tasks.

10. The system of claim 1, wherein the determining the action plan is based on information related to a load of the power grid system and a generation capacity of the power grid system.

11. The system of claim 1, wherein the operations further comprise:
   determining a contingency action plan based on possible contingencies; and
   implementing tasks related to the contingency action plan in response to determining that a contingency of the possible contingencies has occurred.

12. The system of claim 1, wherein the operations further comprise:
   collecting an interruption record comprising information associated with cause and effects of an interruption to a normal operation of the power grid system, and wherein the information comprises alarm information collected from a monitoring control and data acquisition alarm system.

13. The system of claim 12, wherein the information also comprises interruption information relating to a number of affected customer identities and a duration of interruption.

14. The system of claim 1, wherein the action plan further comprises a work preparation checklist, a workload assignment, a work list, and details associated with the set of tasks.

15. A method to monitor operation of a power grid system, comprising:
   receiving, by a system comprising a processor, information associated with scheduled outages on the power grid system;

determining, by the system, that a scheduled outage of the scheduled outages satisfies a predefined criterion relating to an effect on system operation of the power grid system;
measuring, by the system, an operating condition associated with the power grid system;
comparing, by the system, the operating condition to an expected operation limit of the power grid system to generate an operation plan for the scheduled outage;
generating, by the system, an action plan based on the operation plan and the scheduled outage, wherein the action plan comprises a task to be performed to accomplish the action plan;
managing, by the system, execution of a switching management operation by transmitting an instruction to an energy management system and a distribution management system, wherein the instruction relates to the task; and
logging, by the system, the task, the instruction, and a completion time of the task.

16. The method of claim 15, wherein the managing the execution of the switching management operation further comprises facilitating a clearance switching request instruction or a switching order instruction.

17. The method of claim 15, wherein the instruction is associated with managing an equipment outage request, and wherein the managing comprises, receiving a request, submitting the request, verifying the request, approving the request, analyzing the request, and scheduling the request.

18. The method of claim 15, further comprising:
identifying, by the system, equipment that is indirectly affected by an outage in response to the execution of the switching management operation.

19. The method of claim 15, further comprising,
extracting, by the system, data relating to power grid usage and a current condition from a data store and simulating a scenario related to an outage request.

20. The method of claim 15, wherein the logging further comprises recording an update and a followup action associated with the set of tasks.

21. The method of claim 15, further comprising:
determining, by the system, that a planned outage of the planned outages no longer satisfies the defined criterion associated with an effect on system operation of the power grid system; and
removing, by the system, a task associated with the planned outage from the set of tasks.

22. The method of claim 15, further comprising:
determining, by the system, a contingency action plan based on a possible contingency; and
implementing, by the system, a task related to the contingency action plan in response to determining that the contingency occurred.

23. A non-transitory computer readable storage medium comprising executable instructions that, in response to execution, cause a system comprising a processor to perform operations, comprising:
receiving information associated with scheduled outages on a power grid;
determining that a scheduled outage of the scheduled outages satisfies a predefined criterion relating to an effect on system operation of the power grid;
monitoring the power grid to determine a measured operating condition associated with the power grid;
comparing the measured operating condition to an expected operating threshold of the power grid system to generate an operation plan for the scheduled outage;
generating an action plan based on the operation plan and the scheduled outage, wherein the action plan comprises a task to be performed to accomplish the action plan;
managing execution of a switching management operation by transmitting an instruction to a energy management system and a distribution management system, wherein the instruction relates to the task; and
logging the task, the instruction, and a task completion time.

24. The non-transitory computer readable storage medium of claim 23, wherein the operations further comprise:
collecting an interruption record comprising first information associated with a cause and an effect of an interruption to a normal operation of the power grid, wherein the first information comprises second information collected from a monitor control and data acquisition alarm system.

25. The non-transitory computer readable storage medium of claim 23, wherein the operations further comprise:
determining that a planned outage of the planned outages no longer satisfies the defined criterion associated with an effect on system operation of the power grid; and
removing a task associated with the planned outage from the set of tasks.

26. The method of claim 15, further comprising:
collecting, by the system, an interruption record comprising first information associated with a cause and an effect of an interruption to a normal operation of the power grid system, and wherein the first information comprises second information collected from a supervisory control and data acquisition alarm system.

* * * * *